(12) United States Patent
Bert et al.

(10) Patent No.: US 12,086,432 B2
(45) Date of Patent: Sep. 10, 2024

(54) GRADUALLY RECLAIM STORAGE SPACE OCCUPIED BY A PROOF OF SPACE PLOT IN A SOLID STATE DRIVE

(71) Applicant: Micron Technology, Inc., Boise, ID (US)

(72) Inventors: Luca Bert, San Jose, CA (US); Joseph Harold Steinmetz, Loomis, CA (US)

(73) Assignee: Micron Technology, Inc., Boise, ID (US)

( * ) Notice: Subject to any disclaimer, the term of this patent is extended or adjusted under 35 U.S.C. 154(b) by 29 days.

(21) Appl. No.: 17/591,554

(22) Filed: Feb. 2, 2022

(65) Prior Publication Data

US 2023/0244394 A1    Aug. 3, 2023

(51) Int. Cl.
*G06F 3/06* (2006.01)

(52) U.S. Cl.
CPC .......... *G06F 3/0631* (2013.01); *G06F 3/0608* (2013.01); *G06F 3/0634* (2013.01); *G06F 3/0659* (2013.01); *G06F 3/0679* (2013.01)

(58) Field of Classification Search
CPC .... G06F 3/0608; G06F 3/0631; G06F 3/0634; G06F 3/0659; G06F 3/0679
See application file for complete search history.

(56) References Cited

U.S. PATENT DOCUMENTS

| | | |
|---|---|---|
| 8,296,380 B1 | 10/2012 | Kelly et al. |
| 9,674,162 B1 | 6/2017 | Miller et al. |
| 9,916,478 B2 | 3/2018 | Slik |
| 10,101,931 B1 | 10/2018 | Camp et al. |
| 10,552,058 B1 | 2/2020 | Jadon et al. |
| 10,729,030 B1 | 7/2020 | Cousineau et al. |
| 10,831,691 B1 | 11/2020 | Dazzi et al. |
| 11,107,071 B2 | 8/2021 | Carlsson et al. |
| 11,418,402 B1 | 8/2022 | Jakobsson |
| 11,775,188 B2 | 10/2023 | Bert et al. |
| 11,856,058 B2 | 12/2023 | Bert et al. |
| 11,941,254 B2 | 3/2024 | Steinmetz et al. |
| 11,960,756 B2 | 4/2024 | Bert et al. |
| 2006/0288034 A1 | 12/2006 | Do et al. |

(Continued)

OTHER PUBLICATIONS

Park, Sunoo, et al., "SpaceMint: A Cryptocurrency Based on Proofs of Space." International Conference on Financial Cryptography and Data Security, Dec. 7, 2018.

*Primary Examiner* — Larry T Mackall
(74) *Attorney, Agent, or Firm* — Greenberg Traurig

(57) ABSTRACT

An apparatus with a solid state drive (SSD) configured to manage storage resources for proof of space activities. The SSD has a host interface configured to receive at least read commands and write commands from an external host system. The SSD has memory cells formed on at least one integrated circuit die, and a processing device configured to control executions of the read commands and the write commands. In response to an indication of a storage space request for the host system, the apparatus identifies a portion of storage resources used to store the data of the proof of space plot, and reallocates the portion to service the host system. Subsequently, the SSD can continue proof of space activities based on the proof of space plot using the data stored in a remaining portion of the storage resources initially allocated to the proof of space plot.

20 Claims, 8 Drawing Sheets

(56) References Cited

U.S. PATENT DOCUMENTS

| | | | |
|---|---|---|---|
| 2012/0246391 A1* | 9/2012 | Meir | G11C 16/349 711/170 |
| 2014/0173268 A1 | 6/2014 | Hashimoto | |
| 2014/0189890 A1 | 7/2014 | Koeberl et al. | |
| 2015/0254108 A1 | 9/2015 | Kurtzman et al. | |
| 2015/0363248 A1* | 12/2015 | D'Abreu | G06F 11/1068 714/37 |
| 2016/0292672 A1 | 10/2016 | Fay et al. | |
| 2016/0330627 A1 | 11/2016 | Zhang | |
| 2016/0379212 A1 | 12/2016 | Bowman et al. | |
| 2017/0220292 A1* | 8/2017 | Hashimoto | G06F 3/0665 |
| 2017/0337534 A1 | 11/2017 | Goeringer et al. | |
| 2018/0007025 A1 | 1/2018 | Oberheide et al. | |
| 2019/0108518 A1 | 4/2019 | Asif et al. | |
| 2019/0108519 A1 | 4/2019 | Asif et al. | |
| 2019/0280863 A1 | 9/2019 | Meyer et al. | |
| 2019/0324995 A1 | 10/2019 | Jakobsson | |
| 2019/0349185 A1 | 11/2019 | Kim et al. | |
| 2019/0370012 A1 | 12/2019 | Sears et al. | |
| 2019/0370069 A1 | 12/2019 | Swadling et al. | |
| 2019/0379642 A1 | 12/2019 | Simons et al. | |
| 2020/0119903 A1 | 4/2020 | Thomas et al. | |
| 2020/0133898 A1* | 4/2020 | Therene | G06N 5/04 |
| 2020/0134202 A1 | 4/2020 | Sapuntzakis et al. | |
| 2020/0201679 A1 | 6/2020 | Wentz | |
| 2020/0201683 A1 | 6/2020 | Muskal et al. | |
| 2020/0210104 A1 | 7/2020 | Grosz et al. | |
| 2020/0226080 A1 | 7/2020 | Tarango et al. | |
| 2020/0356484 A1 | 11/2020 | Subbarao | |
| 2020/0389312 A1 | 12/2020 | Boneh et al. | |
| 2021/0182423 A1 | 6/2021 | Padmanabhan | |
| 2021/0271667 A1 | 9/2021 | Cohen et al. | |
| 2021/0279371 A1 | 9/2021 | Monji et al. | |
| 2021/0390179 A1 | 12/2021 | Hahn et al. | |
| 2022/0043937 A1 | 2/2022 | Spalding et al. | |
| 2022/0083683 A1 | 3/2022 | Murck et al. | |
| 2022/0116225 A1 | 4/2022 | Cohen et al. | |
| 2022/0129559 A1 | 4/2022 | Duval | |
| 2022/0131848 A1 | 4/2022 | Shiner et al. | |
| 2022/0294644 A1 | 9/2022 | Liu et al. | |
| 2022/0368596 A1 | 11/2022 | Jakobsson | |
| 2022/0377055 A1 | 11/2022 | Liu | |
| 2023/0053269 A1 | 2/2023 | Yang et al. | |
| 2023/0110131 A1 | 4/2023 | Smith et al. | |
| 2023/0115694 A1 | 4/2023 | Cohen et al. | |
| 2023/0132211 A1 | 4/2023 | Ateniese et al. | |
| 2023/0139330 A1 | 5/2023 | Lee et al. | |
| 2023/0185459 A1 | 6/2023 | Steinmetz et al. | |
| 2023/0185476 A1 | 6/2023 | Bert et al. | |
| 2023/0185482 A1 | 6/2023 | Steinmetz et al. | |
| 2023/0185483 A1 | 6/2023 | Steinmetz et al. | |
| 2023/0185738 A1 | 6/2023 | Steinmetz et al. | |
| 2023/0186289 A1 | 6/2023 | Bert et al. | |
| 2023/0188337 A1 | 6/2023 | Bert et al. | |
| 2023/0188366 A1 | 6/2023 | Steinmetz et al. | |
| 2023/0188599 A1 | 6/2023 | Bert et al. | |
| 2023/0244386 A1 | 8/2023 | Steinmetz et al. | |
| 2023/0244393 A1 | 8/2023 | Bert et al. | |

* cited by examiner

US 12,086,432 B2

GRADUALLY RECLAIM STORAGE SPACE OCCUPIED BY A PROOF OF SPACE PLOT IN A SOLID STATE DRIVE

TECHNICAL FIELD

At least some embodiments disclosed herein relate to memory systems in general, and more particularly, but not limited to memory systems configured to support proof of space activities.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
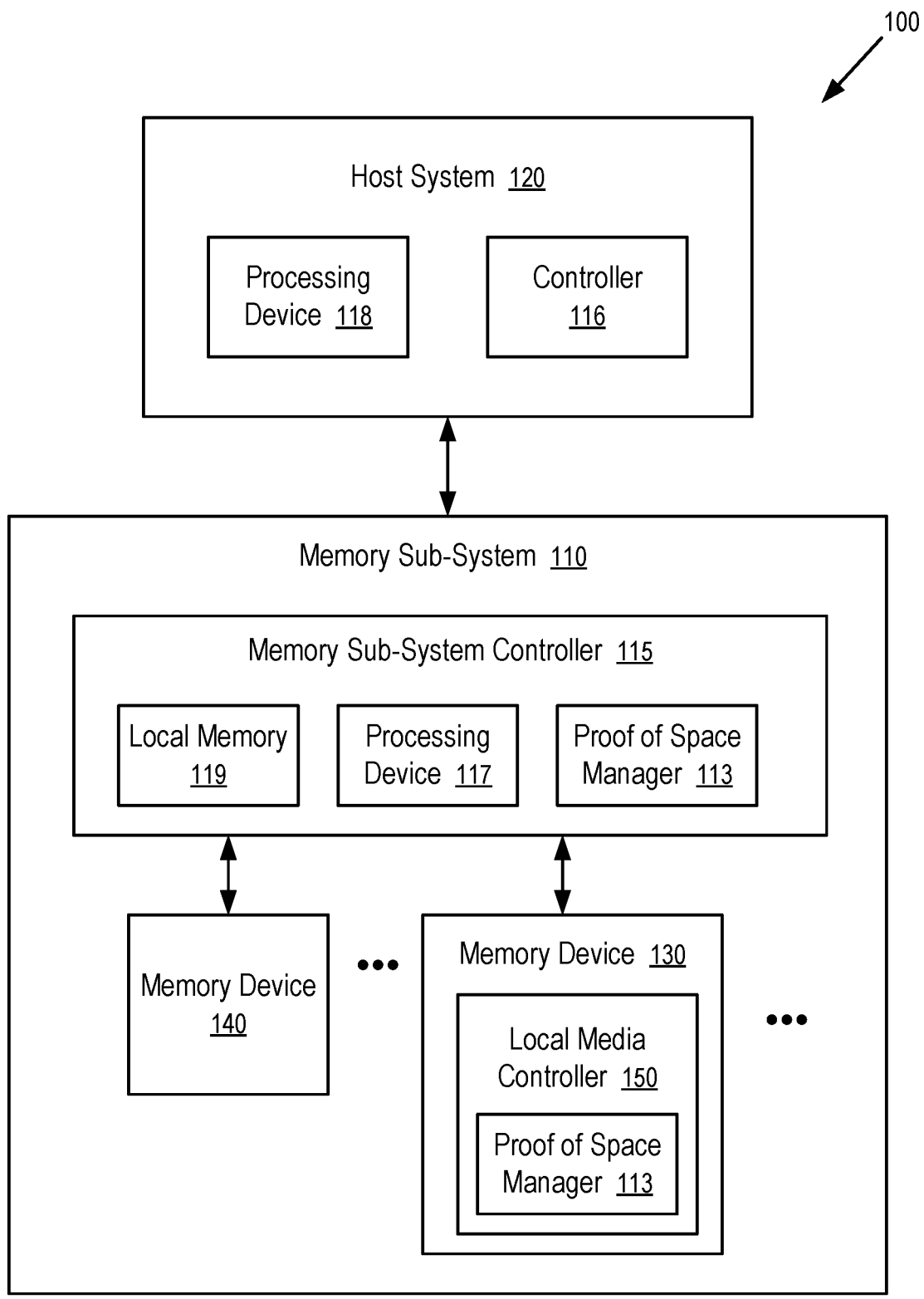
FIG. 1 illustrates an example computing system having a memory sub-system in accordance with some embodiments of the present disclosure.

At least some aspects of the present disclosure are directed to techniques to gradually reclaim a storage space in a memory sub-system occupied by data configured for proof of space activities. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A conventional memory sub-system, such as a hard disk drive (HDD) or a solid state drive (SSD), can be used in activities that require the proof of data storage space. There are known types of challenge-response computations that can be implemented via a set of lookup tables. When the lookup tables are stored in the hard drive or solid state drive, a correct response to a challenge can be generated efficiently using the lookup tables with little computing power and energy consumption. Without storing the lookup tables, it can be unfeasible and/or impractical to generate the correct response on the fly within a short period of time. Thus, in response to a challenge, a correct response to the challenge, generated within a threshold period of time from the challenge, can be seen as a result of the response being generated using the lookup tables stored in a data storage device. Storing the lookup tables occupies an amount of data storage space. Thus, the correct response can be used as a proof of the possession of the amount of spare storage space that is currently used to store the lookup tables. A cryptocurrency network can use proof of space (e.g., to replace proof of work used in other cryptocurrency networks, such as Bitcoin) to improve energy efficiency of computations related to cryptocurrency activities. For example, Chia Network uses proof of space and time to replace energy intensive proof of work.

In general, a plot suitable for proof of space includes data used in challenge-response activities. Such data of a plot typically includes a set of lookup tables with numbers that appear to be random and that are generated from a small amount of initial data. For a given challenge as an input, the lookup tables of the plot can be used to generate a response with very little time and computation and thus little energy expenditure. The correctness of the response can be easily verified using the initial data without the lookup tables. However, it is very difficult and statistically impossible to generate the correct response without the lookup tables. Thus, the correct response can be used as a proof that the response is from an entity having the lookup tables and thus the storage space occupied by the plot of lookup tables. The use of plots to generate responses to proof of space challenges can be referred to as plot farming.

A conventional computer system can have a solid state drive connected to a host system. The host system can send commands to manage and use the storage space provided in the solid state drive. For example, the host system can send a command to the solid state drive to allocate or reserve a portion of the storage capacity of the solid state drive for use. Such a portion can have an identification (e.g., as a namespace or a partition) that establishes a logical address space. The host system can request data to be written at a logical address in the logical address space represented by the identification. For example, after a namespace is created in the solid state drive, the host system can send a write command to request a data item to be written at a logical address in the namespace. The logical address is specific to the namespace and independent of other namespaces. The solid state drive maps the logical address in the namespace to a physical address in the solid state drive to execute the write command. To support proof of space activities, the host system can send commands to the solid state drive to manage storage resources, including allocating storage resources to store proof of space plots, freeing the storage resources used by plots for use by other applications. Since proof of space plots are used to store proof of space look up tables and make the storage resources unusable to a host system, an advantage is recognized in configuring the solid state drive to automatically manage resources not used by the host system such that the host system does not have to carry the burden to manage unused of storage resources.

At least some aspects of the present disclosure address the above and other deficiencies and challenges by a memory sub-system gradually reclaiming storage resources from a proof of space plot for usage by a host system and balancing demands of the host system and the proof of space activities based on the proof of space plot.

To generate a correct response to a proof of space challenge, only a tiny portion of the entire set of data in the proof of space lookup table is required and thus used. When a small portion of the storage resources used by the proof of space plot is reclaimed and used by the host system of the memory sub-system, the proof of space plot data stored in the reclaimed portion of storage resources is not accessible in the memory sub-system. However, the correct responses to proof of space challenges that do not rely upon on the inaccessible data can still be generated using the remaining portion of the proof of space plot on the memory sub-system.

To improve the overall usage of storage resources in servicing the host system and proof of space activities, the memory sub-system can be configured to gradually reclaim storage resources from a proof of space plot as the storage resources usage of the host system increases. When the host system is to use additional storage resources, the memory sub-system can dynamically re-assign a portion of storage resources currently being used by the proof of space plot to the host system, causing a portion of the proof of space lookup tables of the plot to be inaccessible. However, the memory sub-system can still use the remaining data to generate responses, with a high probability of not using the inaccessible portion of lookup table data. Thus, the memory sub-system can gradually reclaim the storage resources of a proof of space plot, gradually weaken the proof of space plot in generating responses to challenges, and prolong the useful life of the proof of space plot in the memory sub-system.

For example, when there are sufficient storage resources for a proof of space plot, the memory sub-system can create a namespace and use storage resources allocated for the namespace to store the proof of space plot. Subsequently, when a host system requests the creation of another namespace to store host data, the memory sub-system can use thin provision to allocate a small portion of the storage resources requested by the host system. When the host system has a request that requires additional storage resources, the memory sub-system can re-allocate a portion of the storage resources used by the namespace of the proof of space plot to the namespace for the host data. The memory sub-system can store data indicating that the portion of the storage resources being inaccessible. When proof of space activities access the inaccessible portion, an error can be generated to fail the operation of generate a response to a proof of space challenge.

Optionally, the memory sub-system can be further configured to gradually transfer the data of the proof of space plot out of the memory sub-system to an auxiliary storage device, such as another memory sub-system connected to the host system in the same computing system, or a memory sub-system in a remote computing system. The transfer avoids the destruction of the proof of space plot, and thus avoids the need to use computing and storage resources in the generation of a replacement plot.

Optionally, when a portion of a proof of space plot is stored outside the memory sub-system, the memory sub-system can communicate with the auxiliary storage device to generate a response when the data required for the generation of the response is stored in the auxiliary storage device.

For example, the memory sub-system can transfer, to an auxiliary storage device, the data of a lookup table used in a last lookup operation in generating the response to a proof of space challenge. In response to the proof of space challenge, the memory sub-system can use the remaining lookup tables to generate a request to perform the last lookup in the table stored in the auxiliary storage device, and sends a request or instruction to the auxiliary storage device to perform the last lookup. Based on the response from the auxiliary storage device, the memory sub-system can generate a response to the proof of space challenge.

Such a technique can allow multiple memory sub-systems, each storing a portion of a proof of space plot, to coordinate with each other to generate responses to proof of space challenges. Thus, a memory sub-system can gradually transfer the plot to another memory sub-system (e.g., in response to storage resources usage demand of its host system); and the memory sub-system can remain effective in proof of space activities during at least a portion of the time period of transferring the proof of space plot.

A communication protocol can be configured to synchronize the activities of different components of a computer system that may use a portion of a memory sub-system for tasks related to proof of space, and tasks not related to proof of space.

For example, the memory sub-system, such as a solid state drive, can have a space manager configured to automatically organize storage resources unused by the host system to support proof of space activities. When the space manager allocates a portion of the storage resources of the memory sub-system for proof of space activities, a proof of space plot can be stored in the portion of the storage resources; and a proof of space application can use the proof of space plot to generate responses to proof of space challenges. However, to an operating system of the computer system, the portion of the storage resources may appear to be unused/unallocated; and without a synchronization operation, an attempt to use the portion of the storage resources directly can cause unpredictable results and/or inferences between proof of space activities performed in a proof of space application and other activities that are not aware of the proof of space plot.

To coordinate the reclaiming of the portion of the storage resources currently occupied by a proof of space plot, a communication protocol can be implemented in the computer system to coordinate various components in stopping the proof of space activities dependent on the proof of space plot before allowing the reallocation of the portion of the storage resources to support activities that are not related to proof of space and/or do not use the proof of space plot. For example, the communication protocol can be implemented via a management module/plugin of the operating system running in the host system and/or the storage manager operating in the memory sub-system.

For example, the storage manager in the memory sub-system can be configured to automatically allocate spare storage resources for proof of space activities. With the coordination provided via the management module/plugin running in the host system, the storage manager can seamlessly return the storage resources, previously allocated for proof of space activities, for use by the host system according to the current storage usage demand of the host system.

For example, when there are storage resources that are not yet allocated to host namespaces that are created in response to commands received from the host system, the memory sub-system can be configured to automatically create plot namespaces to store proof of space plots and support proof of space activities.

The plot namespaces, created by the memory sub-system to store proof of space plots, can be configured to be invisible and/or inaccessible to the host system. Thus, the host system can be isolated from the proof of space activities and data (e.g., cryptocurrency data and associated activities). Optionally, the cryptocurrency activities are be configured to be limited within the plot namespaces for improved security of application data of the host system.

The memory sub-system can manage the storage resources in the plot namespaces and free storage resources that have not yet been allocated to namespaces to meet the storage requests from the host system. In some embodiments, from the point of view of the host system, the storage resources allocated to the plot namespaces can appear to the host system to be the same as free storage resources that have not yet been allocated to any namespaces; and in other embodiments, the plot namespaces allocated by the memory sub-system (and thus not by the host system) are invisible to the host system (e.g., when the host system is connected to the memory sub-system via NVMe). When additional storage resources are to be used by the host system, the memory sub-system can automatically provide the resources from the pool of free storage resources and the storage resources in the plot namespaces. For example, when the currently available free storage resources are insufficient to meet the demand of the host system to create a new host namespace or to enlarge an existing host namespace, the memory sub-system can delete a plot namespace to return its storage resources as free storage resources.

For example, when the operating system in the host system requires additional storage resources to create a new host namespace, or enlarge an existing host namespace, a communication from the management module/plugin in the operating system can request the memory sub-system to provide additional resources. In response, the memory sub-system can identify a plot namespace that is to be deleted to meet the resource request, identify a proof of space application that uses a proof of space plot stored in the plot namespace, and cause the proof of space application to separate/disconnect from the proof of space plot in the plot namespace. After the separation of proof of space plot activities from the plot namespace, the memory sub-system can delete the plot namespace and inform the operation system about the availability of sufficient free storage resources to meet the request for the additional resources for a host namespace.

In one implementation, a proof of space application accesses a proof of space plot via the host system. A management plugin in the operating system running in the host system can request the proof of space application to separate from a plot namespace identified for deletion, before the plot namespace is deleted by the memory sub-system.

In another implementation, a proof of space application can access a proof of space plot without going through the host system (e.g., while the host system is in a low power mode, a sleep mode, or a hibernation mode). A proof of space manager operating in the memory sub-system can request the proof of space application to separate from a plot namespace identified for deletion, before the plot namespace is deleted by the memory sub-system. For example, in response to a request/command from the host system to allocate a portion of spare storage space to a new or existing host namespace, the proof of space application can identify a proof of space application that is active in using the plot namespace to request separate from the plot namespace, before deleting the plot namespace to return its resources as free storage resources to meet the demand for the new or existing host namespaces. In some instances, when the plot namespace to be selected for deletion is not being currently or actively used by, connected to, and/or bound to any proof of space application, the proof of space manager can delete the plot namespace; subsequently, if the proof of space manager receives a request from a proof of space application to use, connect to, and/or bind to the plot in the deleted plot namespace, the proof of space manager can reject the request and/or inform the proof of space application about the deletion of the plot.

In a further implementation, the proof of space manager can manage the relocation of a proof of space plot. For example, when a plot namespace is to be deleted to meet the usage requirements of the host system, the proof of space manager can optionally transfer the plot to another memory sub-system. For example, when a separate memory sub-system attached to the host system, or connected on a computer network but not directly connected to the host system, the proof of space manager can optionally transfer the plot to the separate memory sub-system having free space to avoid the destruction of the proof of space plot. After the plot relocation, the proof of space application previously configured to use, connect to, or bind to the plot in the plot namespace selected for deletion can be reconfigured to use, connect to, or bind to the plot in the separate memory sub-system. In some implementations, the proof of space manager can allocate a set of storage resources to store a plot without creating a plot namespace; and deletion of a plot may not include deletion of a plot namespace. In other implementations, the proof of space manager can generate a plot namespace to store multiple proof of space plots; and a plot stored within the plot namespace can be deleted to reclaim the storage resources occupied by the plot without deleting the entire plot namespace. In some implementations, the size of a plot namespace can be reduced to reclaim a portion of storage resources previously allocated to the plot namespace (e.g., after a plot is deleted from the namespace); and in other implementations, a resource allocation map of the plot namespace can be adjusted to map the entire plot namespace to a reduced set of storage resources (e.g., with multiple portions being mapped to a common set of storage resources, or a portion being mapped to an inaccessible set of storage resources). In some implementations, a plot namespace is created with a capacity to store multiple plots, with the storage sources for each plot being thin-provisioned.

When the host system sends a command to the memory sub-system to delete a host namespace, the memory sub-system can add to the pool the storage resources reclaimed form the deleted host namespace as free storage resources. When the currently available free storage resources are sufficient to store a proof of space plot, the memory sub-system can allocate free storage resources to create a plot namespace.

Optionally, the host system can send a command to the memory sub-system to create a namespace with an indication that the namespace is created for proof of space activities. In response, the memory sub-system can create and manage the plot namespace for proof of space activities. The command from the host system to create the plot namespace can be configured as a permission for the host system to allow the memory sub-system to participate in proof of space activities using the resources allocated to the plot namespace. When the storage resources of the plot namespace are needed for host namespaces, the memory sub-system can delete the plot namespace without an explicit command from the host system for the destruction of the plot namespace. Optionally, the host system can send a command to explicitly request the destruction/deletion of the plot namespace and thus participate in the management of the plot namespace.

Optionally, the host system can request the memory sub-system to identify plot namespaces present on the memory sub-system and use the plot namespaces to participate in proof of space activities.

In some implementations, the management functions of free storage resources and plot namespaces are implemented at least in part in the host system. For example, a module in the operation system and/or a device driver running in the host system can be configured to manage the free storage resources and plot namespaces such that the remaining operating system and applications running the host system can be free from the handling of the plot namespaces and their storage resources.

Optionally, the memory sub-system can have firmware configured to control proof of spaces activities. For example, a solid state drive (SSD) can be configured with a host interface to provide storage services to a host system in a conventional way. The firmware running in the solid state drive (SSD) can participate in proof of space activities and/or cryptocurrency activities in an autonomous way without the supervision and/or computing resources of an external host system connected to the host interface. For example, in the absence of commands from the host system connected to the host interface, the firmware of the solid state drive can be configured to automatically detect a network connection, generate read/write commands, and perform computations to participate in proof of space activities and/or cryptocurrency activities.

For example, independent of host activities and/or without the host system being active and/or connected to the host interface of the solid state drive (SSD), the firmware can perform tasks such as plot generation, plot farming, etc. Thus, the solid state drive (SSD) as a spare component can be used in proof of space before being connected to a host system for normal usage.

The firmware can be configured to use the free space that is not yet used by its host system to generate and/or store one or more plots for proof of space. For example, the firmware can use a plot stored in the memory sub-system (e.g., a hard disk drive (HDD), a solid state drive (SSD), or a memory module) to generate responses for challenges, such as proof of space and time challenges in a cryptocurrency network (e.g., Chia Network, or similar networks).

For improved security, aspects of proof of space activities and/or cryptocurrency activities of the firmware running in the memory sub-system can be configured and/or regulated via configuration data specified using an administrative application. For example, the administrative control of the firmware can be accessed via the host system connected to the host interface of the memory sub-system. Alternatively, or in combination, the administrative control of the firmware can be accessed via a network connection (e.g., without the host system being active or being connected to the host interface).

In some implementations, the memory sub-system can be operational for proof of space activities and/or cryptocurrency activities even without a host system (or with the host system being placed in a sleep mode, a low energy mode, or a hibernation mode). For example, connecting the memory sub-system to a power supply and a network interface card can be sufficient to allow the memory sub-system to operate in a cryptocurrency network. Alternatively, the memory sub-system can be configured to operate in a cryptocurrency network under the condition that the memory sub-system is being connected to a host system that permits the memory sub-system to operate (e.g., when the host system is in an idle state, or independent of the activities of the host system). In some instances, the memory sub-system includes a network interface card, or a wireless transceiver for a network connection to a wireless access point. Thus, before the memory sub-system is installed in a computing system and/or connected to a host system to provide memory and/or storage services for the host system, the firmware of the memory sub-system can allow the free/available storage space of the memory sub-system to be used as a storage appliance in a cryptocurrency network for proof of space.

The memory sub-system can include an internal host configured to reduce the computation burden on the host system connected to the host interface of the memory sub-system. The internal host can be implemented in part via the firmware of the memory sub-system. For example, the host system and the internal host can operate in a collaborative mode where the host system can delegate some or all of the computing tasks to the memory sub-system in activities in a cryptocurrency network.

In general, the administrative control can be used to specify whether the proof of space functionality of the firmware is permitted to run autonomously, how much of the resources the firmware can use and when, what types of activities (e.g., plot generation, plot farming) are permitted, etc. Further, the administrative control can be used to coordinate the separation of a proof of space plot from a proof of space application using, connected to, or bound to the plot, before the deletion of a plot namespace storing the plot.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

In general, a memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, a laptop computer, a network server, a mobile device, a vehicle (e.g., airplane, drone, train, automobile, or other conveyance), an Internet of Things (IOT) enabled device, an embedded computer (e.g., one included in a vehicle, industrial equipment, or a networked commercial device), or such a computing device that includes memory and a processing device.

The computing system 100 can include a host system 120 that is coupled to one or more memory sub-systems 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

For example, the host system 120 can include a processor chipset (e.g., processing device 118) and a software stack executed by the processor chipset. The processor chipset can include one or more cores, one or more caches, a memory controller (e.g., controller 116) (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, a universal serial bus (USB) interface, a Fibre Channel, a Serial Attached SCSI (SAS) interface, a double data rate (DDR) memory bus interface, a Small Computer System Interface (SCSI), a dual in-line memory module (DIMM) interface (e.g., DIMM socket interface that supports Double Data Rate (DDR)), an Open NAND Flash Interface (ONFI), a Double Data Rate (DDR) interface, a Low Power Double Data Rate (LPDDR) interface, a Compute Express Link (CXL) interface, or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The processing device 118 of the host system 120 can be, for example, a microprocessor, a central processing unit (CPU), a processing core of a processor, an execution unit, etc. In some instances, the controller 116 can be referred to as a memory controller, a memory management unit, and/or an initiator. In one example, the controller 116 controls the communications over a bus coupled between the host system 120 and the memory sub-system 110. In general, the controller 116 can send commands or requests to the memory sub-system 110 for desired access to memory devices 130, 140. The controller 116 can further include interface circuitry to communicate with the memory sub-system 110. The interface circuitry can convert responses received from the memory sub-system 110 into information for the host system 120.

The controller 116 of the host system 120 can communicate with the controller 115 of the memory sub-system 110 to perform operations such as reading data, writing data, or erasing data at the memory devices 130, 140 and other such operations. In some instances, the controller 116 is integrated within the same package of the processing device 118. In other instances, the controller 116 is separate from the package of the processing device 118. The controller 116 and/or the processing device 118 can include hardware such as one or more integrated circuits (ICs) and/or discrete components, a buffer memory, a cache memory, or a combination thereof. The controller 116 and/or the processing device 118 can be a microcontroller, special purpose logic circuitry (e.g., a field programmable gate array (FPGA), an application specific integrated circuit (ASIC), etc.), or another suitable processor.

The memory devices 130, 140 can include any combination of the different types of non-volatile memory components and/or volatile memory components. The volatile memory devices (e.g., memory device 140) can be, but are not limited to, random access memory (RAM), such as dynamic random access memory (DRAM) and synchronous dynamic random access memory (SDRAM).

Some examples of non-volatile memory components include a negative-and (or, NOT AND) (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs, or any combination of such. In some embodiments, a particular memory device can include an SLC portion, an MLC portion, a TLC portion, a QLC portion, and/or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory devices such as 3D cross-point type and NAND type memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations (e.g., in response to commands scheduled on a command bus by controller 116). The controller 115 can include hardware such as one or more integrated circuits (ICs) and/or discrete components, a buffer memory, or a combination thereof. The hardware can include digital circuitry with dedicated (i.e., hard-coded) logic to perform the operations described herein. The controller 115 can be a microcontroller, special purpose logic circuitry (e.g., a field programmable gate array (FPGA), an application specific integrated circuit (ASIC), etc.), or another suitable processor.

The controller 115 can include a processing device 117 (processor) configured to execute instructions stored in a local memory 119. In the illustrated example, the local memory 119 of the controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the controller 115, in another embodiment of the present disclosure, a memory sub-system 110 does not include a controller 115, and can instead rely upon external control (e.g., provided by an external host, or by a processor or controller separate from the memory sub-system).

In general, the controller 115 can receive commands or operations from the host system 120 and can convert the commands or operations into instructions or appropriate commands to achieve the desired access to the memory devices 130. The controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the controller 115 and decode the address to access the memory devices 130.

In some embodiments, the memory devices 130 include local media controllers 150 that operate in conjunction with the memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local media controller 150) for media management within the same memory device package. An example of a managed memory device is a managed NAND (MNAND) device.

The controller 115 and/or a memory device 130 can include a proof of space manager 113 configured to manage the unused portion of the storage capacity of the memory sub-system 110 to show proof of space without the help or commands from the host system 120. In some embodiments, the controller 115 in the memory sub-system 110 includes at least a portion of the proof of space manager 113. In other embodiments, or in combination, the controller 116 and/or the processing device 118 in the host system 120 includes at least a portion of the proof of space manager 113. For example, the controller 115, the controller 116, and/or the processing device 118 can include logic circuitry implementing the proof of space manager 113. For example, the controller 115, or the processing device 118 (processor) of the host system 120, can be configured to execute instructions stored in memory for performing the operations of the proof of space manager 113 described herein. In some embodiments, the proof of space manager 113 is implemented in an integrated circuit chip disposed in the memory sub-system 110. In other embodiments, the proof of space manager 113 can be part of firmware of the memory sub-system 110, an operating system of the host system 120, a device driver, or an application, or any combination therein.

For example, the proof of space manager 113 implemented in the controller 115 can manage storage resources, unused by the host system 120, in the memory sub-system 110, generate plots and/or farm plots in the unused portion to participate in activities in a cryptocurrency network, without relying on the computing resources of the host system 120. The host system 120 can be in a low power mode, a sleep mode, or a hibernation mode, while the proof of space manager 113 is sufficient to operate the memory sub-system 110 to participate activities in a cryptocurrency network. Optionally, the proof of space manager 113 can function as a host, specialized for proof of space activities and/or cryptocurrency activities, such that resources in the memory sub-system 110 that are not used by the host system 120 can be used to gain benefits of participating in proof of space activities and/or cryptocurrency activities.

When the memory sub-system 110 is in communication with the host system 120, the host system 120 can send commands to configure the operations of the proof of space manager 113. For example, the host system 120 can provide a user interface that is usable to specify whether the proof of space manager 113 is permitted to operate autonomously without instructions/requests from the host system 120. The permission can be specified by writing data to a register, or a predetermined location or region within a memory device (e.g., 130 or 140) in the memory sub-system 110. Similarly, the host system 120 can write configuration data into the memory sub-system 110 to specify how much, if not all of the unused portion, of the storage capacity of the memory sub-system 110 can be used by the proof of space manager 113 in proof of space activities, when or under what conditions the proof of space activities are permitted, whether plot generation is permitted, whether plot farming is permitted, etc.

Optionally, the proof of space manager 113 can use a network connection without going through the host system 120; and the configuration data can be specified for the proof of space manager 113 via the network connection. For example, the memory sub-system 110 can include an interface for a connection to a network interface card, or a wireless transceiver for a wireless network connection to an access point. The interface is usable by the proof of space manager 113 without the processing device 118 and/or the controller 116 of the host system 120. In some implementations, the memory sub-system 110 can further include a network interface card and/or a wireless transceiver (e.g., for a wired network connection, for a WiFi connection, or Bluetooth connection, or a cellular communications connection); and providing power to the memory sub-system 110 with a connection to the Internet is sufficient to enable the memory sub-system 110 to operate in a cryptocurrency network.

Figure 2:
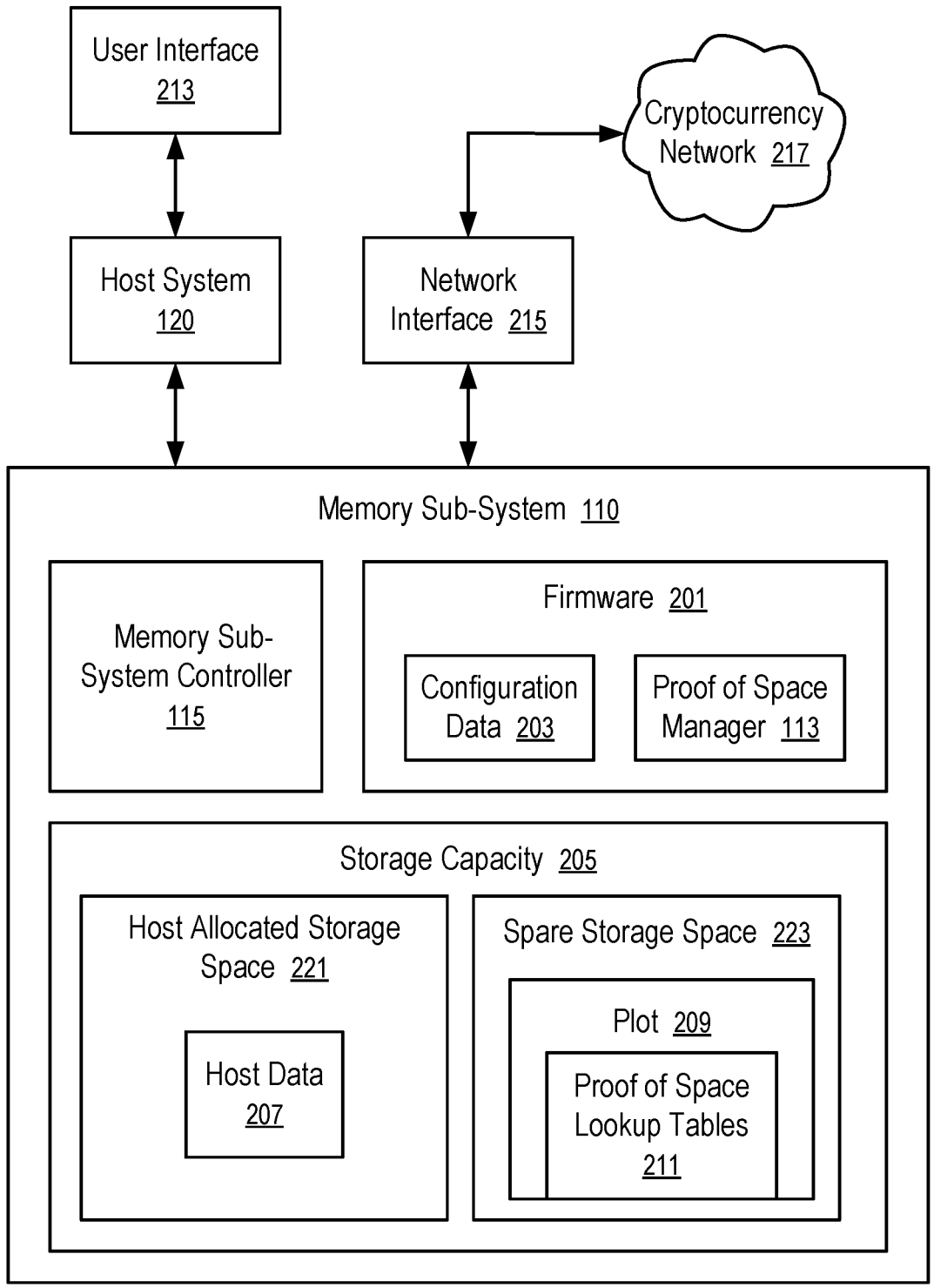
FIG. 2 shows a memory sub-system having firmware to manage storage space to support proof of space activities according to one embodiment.

FIG. 2 shows a memory sub-system 110 having firmware 201 to control proof of space activities according to one embodiment. For example, the memory sub-system 110 of FIG. 1 can be implemented according to FIG. 2.

In FIG. 2, the memory sub-system 110 has a memory sub-system controller 115 and firmware 201. The firmware 201 has configuration data 203 and a proof of space manager 113 configured to operate according to the permissions and restrictions specified in the configuration data 203.

The storage capacity 205 of the memory sub-system 110 can include a host allocated storage space 221 and a spare storage space 223.

The host allocated storage space 221 is a portion of the storage capacity 205 explicitly reserved by the host system 120 for use by the operating system and/or applications running in the host system 120. The host system 120 transmits one or more commands to the memory sub-system 110 to reserve the space 221 (e.g., by creating one or more namespaces or partitions of host-specified sizes). The host allocated storage space 221 is not available for proof of space plots and activities controlled by the proof of space manager 113. The host system 120 can send write commands to the memory sub-system 110 to store host data 207 in the host allocated storage space 221.

The spare storage space 223 is a portion of the storage capacity that is not reserved and not used by the host system 120 for storing host data 207 used by the operating system and/or applications running in the host system. The proof of space manager 113 can automatically identify the spare storage space 223 and used it for proof of space activities controlled by the proof of space manager 113, such as generating and storing a plot 209, farming the plot 209 for the cryptocurrency network 217, etc.

The proof of space manager 113 can be configured to use the spare storage space 223 when its storage resources is not required for the operation of the host system 120. When the host system 120 needs a portion of the resources of the spare storage space 223, the proof of space manager 113 can manage the reclaiming of the resources from the plot 209 as if the resources were free and had not been used by the plot 209. Thus, the operations of proof of space manager 113 related to the plot 209 has no impact, or minimized impact, on the host system 120 accessing the resources in the spare storage space 223.

When the host system 120 sends, to the memory sub-system 110, a command to reduce the host allocated storage space 221 (e.g., by deleting a namespace or partition, downsizing a namespace or partition), storage resources freed via the execution of the command become part of the spare storage space 223 usable to support proof of space activities.

When the host system 120 sends, to the memory sub-system 110, a command to increase the host allocated storage space 221 (e.g., by creating a new namespace or partition, enlarging a namespace or partition), the proof of space manager 113 can reduce the storage resources used by plots (e.g., 209) to allocate sufficient storage resources to the host allocated storage space 221 (e.g., via deleting a plot 209).

Optionally, the host system 120 can send a command to the memory sub-system 110 to reserve at least a portion of the spare storage space 223 for one or more plots (e.g., 209). The host system 120 indicates to the memory sub-system 110 such a reserved portion is for proof of space; and in response, the memory sub-system 110 can take over the responsibility for managing the portion as part of the spare storage space 223 and/or the de-allocation of the portion when storage resources are needed for host data 207 and/or the host allocated storage space 221.

Optionally, when the memory sub-system 110 is not connected to the host system 120, the firmware 201 can be configured to control the operations of the memory sub-system 110 and the network interface 215.

For example, the firmware 201 running in the memory sub-system controller 115 can detect the connection to a network interface 215 and issue commands to the network interface 215 and the memory sub-system controller 115 in a way similar to the host system 120 using the memory sub-system 110 and the network interface 215. The proof of space manager 113 can use a portion of the storage capacity 205 of the memory sub-system 110 to generate and store a plot 209 that includes proof of space lookup tables 211, and use the plot 209 to generate responses to proof of space challenges. In general, the network interface 215 can be part of the computing system 100, part of the host system 120, or part of the memory sub-system 110.

The storage capacity 205 of the memory sub-system 110 can include the storage capacities of memory devices (e.g., memory devices 130, 140 illustrated in FIG. 1) configured in the memory sub-system 110. A portion of the storage capacity 205 (e.g., host allocated storage space 221) can be reserved for servicing the host system 120 and store host data 207 received from the host system 120. The remaining portion of the storage capacity 205 (e.g., the spare storage space 223) that is not going to be used by the host system 120 for a period of time can be used to store a plot 209. Since the plot 209 is used to store the proof of space lookup tables 211, the storage space occupied by the plot 209 is not available for use by the host system 120 and thus considered the free/spare storage space 223.

To generate the plot 209, the proof of space manager 113 can receive a small amount of initial data and perform computations to compute the numbers in the proof of space lookup tables 211 according to a predefined computing procedure. In general, any algorithms of proof of space can be used; and the implementation of the proof of space manager 113 is not limited to a particular cryptocurrency network (e.g., Chia Network).

To farm the plot 209, the proof of space manager 113 can receive a challenge and use the plot 209 to generate a response that can be easily validated using the small amount of the initial data. The correct, validated response can be seen as a proof that the large amount of data of the plot 209 is stored in a storage space (e.g., in storage capacity 205 provided by memory devices 130, . . . , 140 of the memory sub-system 110).

Optionally, the host system 120 can also run an application to generate plots (e.g., as part of the host data 207) and farm the plots. Thus, the memory sub-system 110 is operable to have two parallel systems for plot generating and farming.

For example, after a namespace is allocated in the storage capacity 205, a logical storage location in the portion of storage capacity 205 represented by the namespace can be referred to via a combination of the namespace and a logical address within the namespace. The memory sub-system controller 115 can map such a logical address in the namespace into a physical address in the memory device(s) 130, . . . , 140 to store data (e.g., the host data 207, or the data of the plot 209).

Optionally, the firmware 201 can be configured to automatically allocate a portion of the storage capacity 205 not used by the host system 120 to one or more namespaces hidden to the host system 120 to store plot 209 controlled by the proof of space manager 113. When the storage resources used by the plot 209 are needed for an operation of the host system 120, the firmware 201 can dynamically delete the namespace used to host the plot 209 and provide the reclaimed storage resources for use by the host system 120, as if it had never been used for storing the plot 209.

Optionally, each plot 209 is hosted in a separate namespace to simplify storage space management and/or reduce or minimize the granularity of namespaces used for plots (e.g., 209). When the storage space currently used by a plot (e.g., 209) is to be used by the host system 120, the proof of space manager 113 can dynamically delete the plot namespace and free up the storage space occupied by the plot (e.g., 209) for the host system 120.

In one implementation, the proof of space manager 113 is implemented via a hardware component, such as a field programmable gate array (FPGA), an application specific integrated circuit (ASIC), a System on a Chip (SoC), etc. The memory sub-system 110 can be configured with two host interfaces. One host interface of the memory sub-system 110 is connectable to an external host system 120; and another host interface is connected to the hardware component of the proof of space manager 113. The memory sub-system controller 115 is accessible via any of the two host interfaces to receive read/write commands from the external host system 120 and the proof of space manager 113 respectively.

Alternatively, as illustrated in FIG. 2, the proof of space manager 113 is implemented as part of the firmware 201 running in the processing device 117 of the memory sub-system controller 115. Thus, a portion of the processing power of the memory sub-system controller 115 can be used to execute the instructions of the proof of space manager 113 (e.g., to generate read/write commands related to the plot 209) without a physical host interface between the memory sub-system controller 115 and the proof of space manager 113.

The host system 120 can run an application to provide a user interface 213 to specify and/or adjust the configuration data 203 of the proof of space manager 113. Alternatively, a user device (e.g., a mobile phone, a tablet computer, a notebook computer, a personal computer, a personal media player) can be connected to the network interface 215 to specify and/or adjust the configuration data 203. The network interface 215 can include a transceiver for a wired or wireless network connection, such as a local area network, a wireless local area network, a personal area network, a cellular communications network, etc. The network interface 215 can be connected to a cryptocurrency network 217 that implements a blockchain using proof of space to regulate activities or transactions.

The configuration data 203 can include resource restrictions, allowed activities, account identification, permissions, etc.

For example, resource restrictions can specify a limit on the percentage of the storage capacity 205 of the memory sub-system 110 that is allowed to be used by the proof of space manager 113 to store one or more plots 209.

For example, resource restrictions can specify a limit on the percentage of the computing resources of the memory sub-system controller 115 that can be used by the proof of space manager 113.

For example, resource restrictions can specify a limit on data access bandwidth to the storage capacity 205 that is allowed to be used by the proof of space manager 113.

For example, resource restrictions can specify a limit on program-erase budget of the storage capacity 205 that is allowed to be used by the proof of space manager 113.

When an activity (e.g., plot generation, plot farming) is explicitly specified as one of the allowed activities, the proof of space manager 113 can perform the activities when connected to the network interface 215 and/or the cryptocurrency network 217. Otherwise, the proof of space manager 113 is blocked to prevent the activity that is not included in the allowed activities.

The configuration data 203 can include account identification associated with an account in the cryptocurrency network 217 and/or the plot 209. For example, the account identification can include a cryptographic key used to represent an owner of the account and/or as part of an initial data to generate the plot 209.

The permissions in the configuration data 203 can specify whether and/or when the proof of space manager 113 can operate autonomously. For example, the permissions can be configured to indicate that the proof of space manager 113 is permitted to start operation after receiving an explicit request from the host system 120. For example, the permissions can be configured to indicate that the proof of space manager 113 can operate autonomously when the host system 120 is inactive but cannot operate when the host system 120 is active. For example, the permissions can be configured to indicate that proof of space manager 113 can operate whenever the proof of space manager 113 can access the cryptocurrency network 217.

Figure 3:
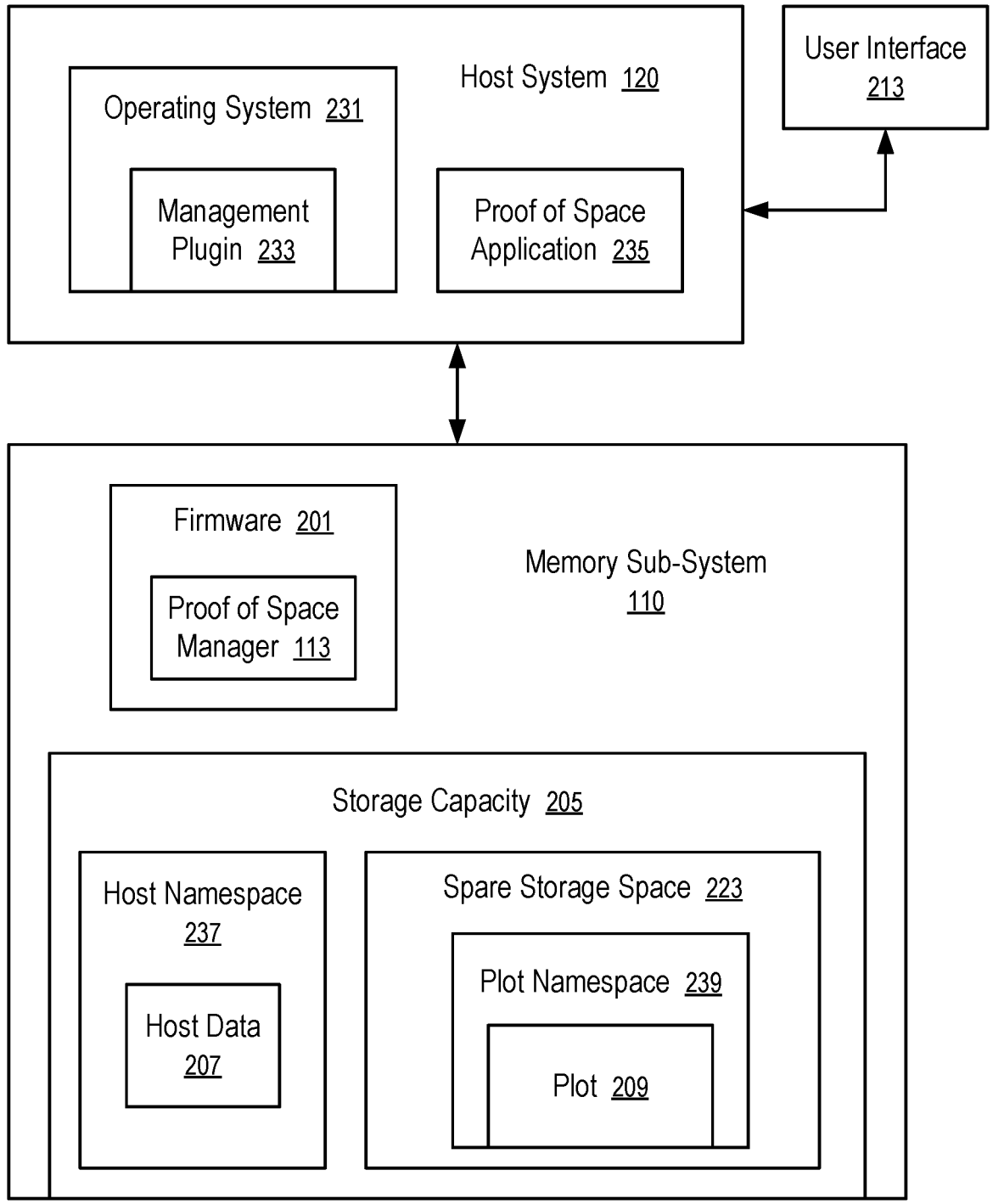
FIG. 3 illustrates a system configured with a communication protocol reclaim storage space occupied by proof of space plots in a memory sub-system according to one embodiment.

FIG. 3 illustrates a system configured with a communication protocol reclaim storage space occupied by proof of space plots in a memory sub-system according to one embodiment.

For example, the system of FIG. 3 can be implemented using a memory sub-system 110 of FIG. 1 and/or FIG. 2.

In FIG. 3, a proof of space application 235 runs in a host system 120 to use a proof of space plot 209 to generate responses to proof of space challenges (e.g., in a cryptocurrency network 217).

Alternatively, the proof space application 235 can be configured to run in a separate computing device in the cryptocurrency network 217 and access the plot namespace 239 via the host system 120.

The host system 120 runs an operating system 231 that has a management plugin 233 in communication with the firmware 201 running in the memory sub-system 110.

In response to requests or commands from the operating system, the memory sub-system 110 can create a host namespace 237 that allocates a portion of the storage capacity 205 of the memory sub-system 110 to store host data 207. The host system 120 can address a storage unit in the host namespace 237 by referencing a logical address defined in the host namespace 237.

The proof of space manager 113, configured by the management plugin 233 and/or in communication with the management plugin 233, can create a plot namespace 239 in the spare storage space 223 that has not yet been allocated to any host namespaces (e.g., 237).

The proof of space application 235 can access the plot in the plot namespace 239 via communication with the proof of space manager 113.

When the operating system 231 is to use a portion of the spare storage space 223 (e.g., to expand an existing host namespace 237, to create a new host namespace 237, in response to a request from a user interface 213), the spare storage space 223 may not have sufficient resources without deleting a plot namespace 239 and reclaiming the storage resources from the plot namespace 239.

The management plugin 233 can communicate with the proof space manager 113 to determine and identify the proof of space application 235 that is currently using, connected to, and/or bound with the plot 209 in the plot namespace 239 that is to be deleted.

With the identification of the proof of space application 235, the management plugin 233 and/or the proof of space manager 113 can request the proof of space application 235 to separate, disconnect from the plot 209 and stop using the plot 209.

After receiving a confirmation or response from the proof of space application 235 indication a disconnection from the plot 209, the management plugin 233 can communicate with the proof of space manager 113 to delete the plot namespace 239 to provide storage resources (e.g., to expand an existing host namespace 237, to create a new host namespace 237).

Similar communications can be implemented when the memory sub-system 110 implements thin provision of a host namespace 237. During thin provision of the host namespace 237, the memory sub-system 110 initially allocates a fraction of the storage capacity requested by the host system 120 for the host namespace 237. When the host system 120 starts to more storage resources in the host namespace 237 beyond the fraction of the storage capacity initially allocated to the host namespace 237, the firmware 201 of the memory sub-system 110 can allocate more storage resources from the spare storage space 223 to the host namespace 237. In response, the management plugin 233 and the proof of space manager 113 can communicate to identify the proof of space application 235, stop the use of the plot 209, disconnect and/or separate the proof of space application 235 from the plot namespace 239, and then delete the plot namespace 239 to release storage resources for allocation to the host namespace 237.

FIG. 3 illustrates an implementation where a proof of space application 235 accesses the plot 209 from and/or via the host system 120.

In other implementations, the proof of space application 235 can be implemented with the memory sub-system 110, or be connected to the memory sub-system 110 through a network interface (e.g., 215 in FIG. 2 from a cryptocurrency network 217) without going through the host system 120. In such implementations, the management plugin 233 can be implemented in the firmware 201 and/or the memory sub-system 110 to shield the host system 120 from proof of space activities and communications.

Figure 4:
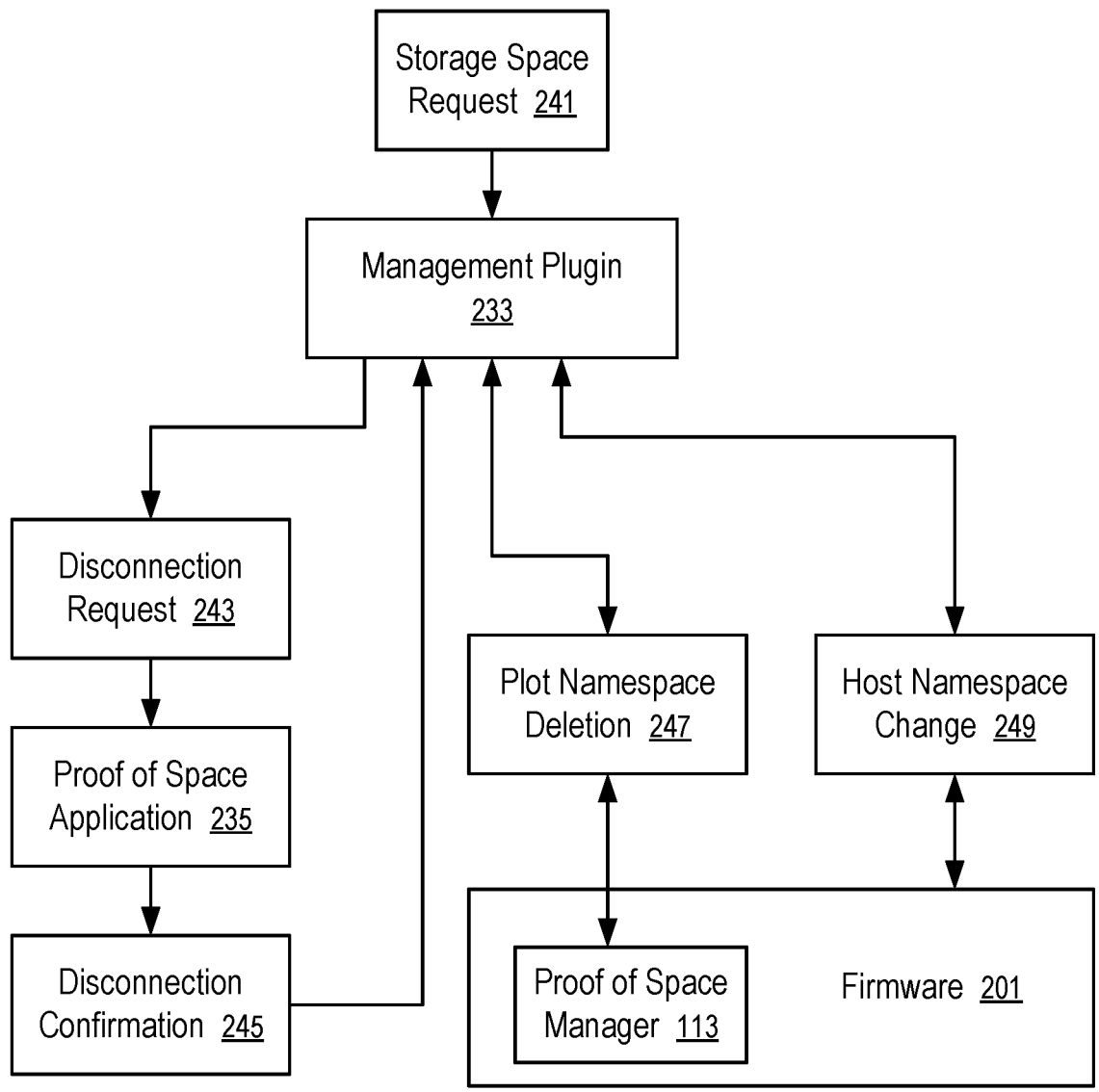
FIG. 4 illustrates communications to reclaim storage space occupied by proof of space plots in a memory sub-system according to one embodiment.

FIG. 4 illustrates communications to reclaim storage space occupied by proof of space plots in a memory sub-system according to one embodiment.

For example, the communications of FIG. 4 can be implemented in a system of FIG. 3, or in a system in which a proof of space application 235 runs in the memory sub-system 110, or be connected to the memory sub-system 110 through a network interface (e.g., 215 in FIG. 2 from a cryptocurrency network 217) without going through the host system 120.

In FIG. 4, a storage space request 241 can be generated in response to a user request in a user interface 213 to create a new host namespace 237 in the memory sub-system 110 to expand an existing host namespace 237, or in response to a determination that a thin-provisioned host namespace 237 needs additional storage resources to meet the usage requests from a host system 120.

In response to the storage space request 241 for a host namespace 237, a management plugin 233 determines whether currently available free storage resources in the memory sub-system 110 is sufficient to meet storage space request 241. If there are insufficient free storage resources to meet the storage space request 241, the management plugin is configured to identify a plot namespace 239 for deletion.

To reclaim the storage resources currently occupied by the plot namespace 239, the management plugin 233 is configured to identify a proof of space application 235 that is currently using (or being connected to) a proof of space plot 209 stored in the plot namespace 239. The management plugin 233 sends a disconnection request 243. In response, the proof of space application 235 stops usage of the proof of space plot 209 in the plot namespace 239 and provides a disconnection confirmation 245.

After receiving the disconnection confirmation 245, the management plugin 233 can communicate with the proof of space manager 113 in the memory sub-system 110 to perform deletion 247 of the plot namespace 239.

After the deletion 247 of the plot namespace 239, the storage resources previously occupied by the proof of space plot 209 become free storage resources in the spare storage space 223. When there are sufficient free storage resources in the memory sub-system 110, the management plugin 233 can communicate with the firmware 201 of the memory sub-system 110 to implement a change 249 for the host namespace 237 identified in the storage space request 241. For example, the change 249 can include creating the new host namespace 237, expanding the existing host namespace 237, allocating more storage resources to the thin-provisioned host namespace 237, etc.

The management plugin 233 can be implemented as a module in the operating system 231 running in the host system 120, and/or a module in the firmware 201 of the memory sub-system 110.

In some implementations, a proof of space application 235 accesses a plot 209 in the memory sub-system 110 via the management plugin 233; and thus, the management plugin 233 can identify the proof of space application that uses a plot namespace 239 based on a record of usage of plot namespaces (e.g., 239). In other implementations, a proof of space application 235 accesses a plot 209 in the memory sub-system 110 via a proof of space manager 113; and the management plugin 233 communicates with the proof of space manager 113 to identify the proof of space application that uses a plot namespace 239 that can be selected for deletion.

Instead of deleting a plot namespace 239 entirely in response to a single storage space request 241, the memory sub-system 110 can gradually destruct the plot namespace 239 over a period of time of host usages of the storage resources initially allocated to the plot namespace 239, as illustrated below in FIG. 5.

Figure 5:
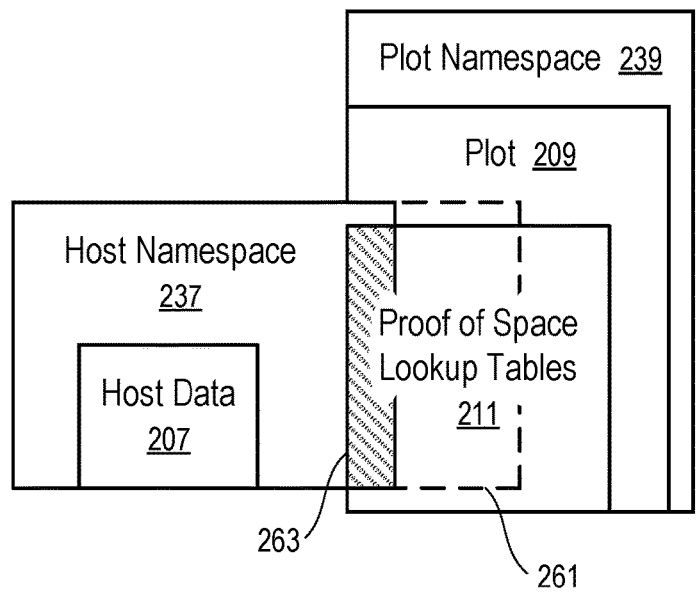
FIG. 5 illustrates a thin provision technique to gradually reclaim the storage resources used by a proof of space plot according to one embodiment.

FIG. 5 illustrates a thin provision technique to gradually reclaim the storage resources used by a proof of space plot according to one embodiment.

For example, when the host system 120 requests the memory sub-system 110 to create a host namespace 237 having a size 261, the memory sub-system 110 can initially allocate a portion of the storage resources required by the size 261 to allow the host system 120 to store the host data 207 without using the storage resources allocated to the plot namespace 239.

When the host system 120 uses more storage resources in the host namespace, the free storage resources in the memory sub-system 110 can become insufficient without using a portion 263 of the storage resources of the plot namespace 239. Thus, the memory sub-system 110 and/or the proof of space manager 113 reallocates a portion 263 to the host namespace 237. The existing proof of space lookup table data in the portion 263 is erased for the host system 120 to store host data 207.

After the portion 263 of the storage resources of the plot namespace 239 is reallocated to the host namespace 237, the portion 263 becomes inaccessible to the plot namespace 239 and the proof of space activities configured in the plot namespace 239. When a read attempt is performed on the portion 263, a read error can be generated as a response, as if the storage resources in the portion 263 were still in the plot namespace 239, but became damaged and unreadable. However, proof of space activities that do not depend on the portion 263 can continue. Thus, the useful life of the plot 209 in the plot namespace 239 is extended.

Figure 6:
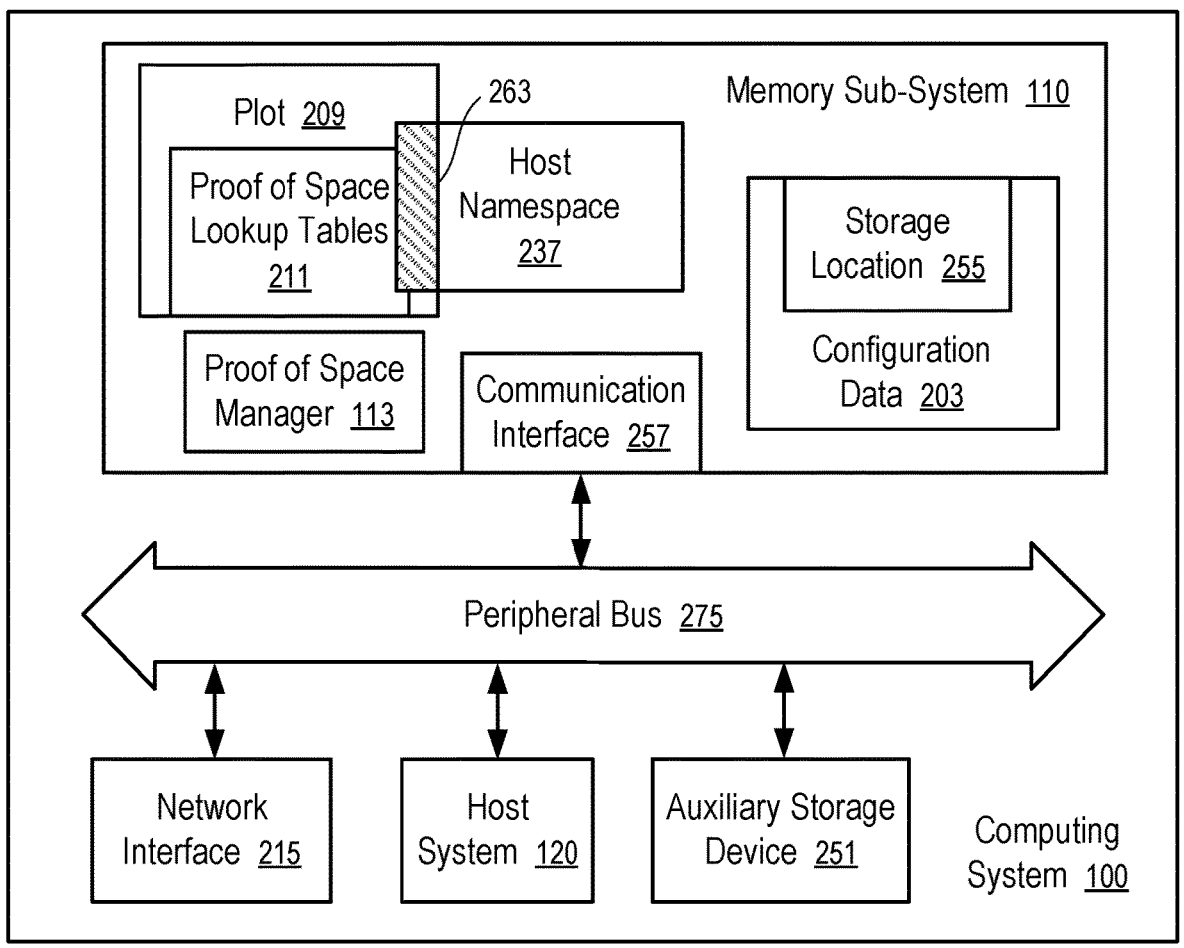
FIG. 6 shows the transfer of a portion of a proof of space plot out of a memory sub-system according to one embodiment.
Figure 7:
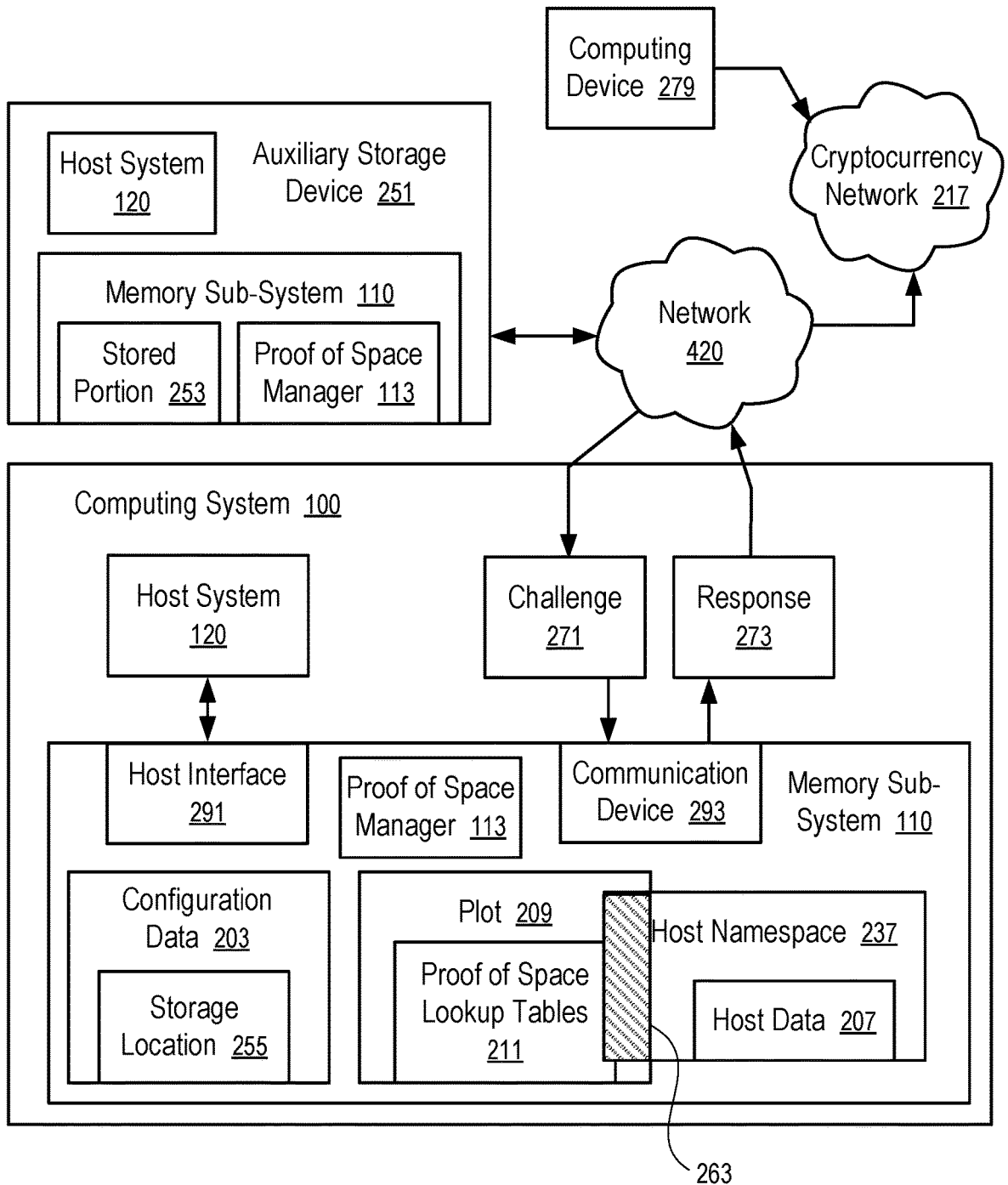
FIG. 7 shows a gradual transfer of a proof of space plot in reclaim storage resources occupied by the plot in a memory sub-system according to one embodiment.

Optionally, the proof of space lookup table data in the portion 263 can be read and stored into an auxiliary storage device (e.g., 251 as illustrated in FIG. 6 and FIG. 7 and discussed below) before the portion 263 is reallocated to the host namespace 237. The proof of space manager 113 in the memory sub-system 110 can be configured to communicate with the auxiliary storage device to access the data in the portion during proof of space activities.

FIG. 6 shows the transfer of a portion of a proof of space plot out of a memory sub-system according to one embodiment. For example, the computing system 100 in FIG. 6 can be used to implement the gradual reclaiming of the portion 263 of storage resources from the plot namespace 239 in FIG. 5. The memory sub-system 110 in FIG. 6 can be implemented using the techniques discussed above in connection with FIG. 1 to FIG. 4.

In FIG. 6, the computing system 100 has an auxiliary storage device 251. A peripheral bus 275 connects the memory sub-system 110, the auxiliary storage device 251, a host system 120, and a network interface 215.

For example, when the host system 120 is in a suitable mode (e.g., a low power mode, a sleep mode, or a hibernation mode), the memory sub-system 110 can function as a host to the network interface 215 and the auxiliary storage device 251.

In FIG. 3, the memory sub-system 110 has a communication interface 257 that can function as a host interface in communication with the host system 120. The host system 120 can use the network interface 215 via the peripheral bus 275.

In one implementation, the communication interface 257 can function as a host of the network interface 215 under a predetermined condition. For example, when the host system 120 is in a low power mode, a sleep mode, a hibernation mode, or when the host system 120 is not using the peripheral bus 275, the communication interface 257 can function as a host of the network interface 215 to use the network interface 215.

When the memory sub-system 110 is in control of the network interface 215, the proof of space manager 113 in the memory sub-system 110 can receive a proof of space challenge from a cryptocurrency network 217, use the proof of space lookup tables 211 to generate a winning response, and provide the response through the communication interface 257, the peripheral bus 275, and the network interface 215 to the cryptocurrency network 217.

Thus, using the network interface 215, the memory sub-system 110 can receive a proof of space challenge from a cryptocurrency network 217 without assistance from the host system 120, and generate a response to the proof of space challenge using the plot 209.

Before the usage of storage resources by a host namespace 237 grows into the plot 209, the proof of space manager 113 can copy data from a portion 263 of the plot 209 into the auxiliary storage device 251. Thus, when the usage of storage resources by a host namespace 237 grows into the plot 209, the data in the portion 263 remain accessible to, or usable to, the proof of space manager 113 to support proof of space activities configured on the plot 209.

For example, before the host system 120 demands the use of storage resources to cause the reallocation of the portion 263 to the plot 209, the demand can be predicted and cause the memory sub-system 110 and/or the host system 120 to perform operations to copy the proof of space plot data from the portion into the auxiliary storage device 251. For example, the copying operation can be permitted via the configuration data 203 store data representative of storage location 255 in the auxiliary storage device 251 for the portion. Further, the storage location 255 can be used by the proof of space manager 113 to read the data from the auxiliary storage device 251 when the proof of space activities depends on the data previously stored in the portion 263.

Optionally, the copying of the data from the portion 263 to the auxiliary storage device 251 can be in response to a storage space request 241 resulting from an active write request from the host system 120.

After the portion 263 is reallocated to the host namespace 237, the proof of space manager 113 can use the plot data stored in the auxiliary storage device 251 according to the storage location 255 specified in the configuration data 203.

In some instances, the auxiliary storage device 251 is a memory sub-system having a proof of space manager 113, similar to the memory sub-system 110. For example, when the auxiliary storage device 251 has an amount of storage resources to store the portion 263 but insufficient to store the entire plot 209, storing the plot data for the portion 263 in the auxiliary storage device 251 allows the memory sub-system 110 to operate the plot 209.

In some instances, the auxiliary storage device 251 can be configured on a computer network and/or on a remote computing system.

FIG. 7 shows a gradual transfer of a proof of space plot in reclaim storage resources occupied by the plot in a memory sub-system according to one embodiment. For example, the computing system 100 in FIG. 6 can be used to implement the gradual reclaiming of the portion 263 of storage resources from the plot namespace 239 in FIG. 5. The memory sub-system 110 in FIG. 6 can be implemented using the techniques discussed above in connection with FIG. 1 to FIG. 4.

In FIG. 7, the configuration data 203 identifies a storage location 255 in an auxiliary storage device 251 that is connected to the computing system 100 via a network 420.

As the storage resource usage of the host namespace 237 grow, a portion 263 of the plot 209 can be relocated into the memory sub-system 110 in the auxiliary storage device 251 as the stored portion 253 of the plot 209 in the auxiliary storage device 251. For example, the stored portion 253 can be in a plot namespace in the memory sub-system 110 of the auxiliary storage device 251.

In response to a proof of space challenge 271 from a cryptocurrency network 217 (e.g., from a computing device 279), the proof of space manager 113 in the computing system 100 can generate, using the remaining portion of the plot 209, an intermediate response. The intermediate response is transmitted to the proof of space manager 113 in the auxiliary storage device 251. The proof of space manager 113 in the auxiliary storage device 251 can use the intermediate response, as if it were generated in the auxiliary storage device using the portion of the plot 209 in the computing system, and continue the lookup operations to generate the response 273 to the challenge 271 using the plot data (e.g., the stored portion 253) previously stored in the portion 263 now being used by the host namespace 237. The response 273 can be provided to the proof of space manager 113 in the computing system 100, which in turn provides the response to the cryptocurrency network 217.

In another example, the portion 263 is selected as data required to generate the intermediate response. Thus, in response to the challenge 271, the proof of space manager 113 of the computing system 100 forward the challenge 271 to the proof of space manager 113 in the auxiliary storage device 251 to generate the intermediate response. After receiving the intermediate response from the auxiliary storage device 251, the proof of space manager 113 in the computing system 100 can continue the lookup operations using the remaining portion of the plot 209, as if the intermediate response were generated using the plot data (e.g., the stored portion 253).

Using the technique of FIG. 7, the existence of a plot 209 can dynamically flow among multiple memory sub-systems 110 connected via a network 420. Thus, based on the availability and/or unavailability of amounts of storage resources in the memory sub-systems 110, the memory sub-systems 110 can collaboratively host a proof of space plot 209, and/or gradually transfer a plot 209 from one memory sub-system to another memory sub-system, while allowing the use of the plot 209 during the gradual transfer over time. The transfer can be driven in part the storage resource usages by the host systems 120 of the memory sub-systems 110 and/or the availability of new memory sub-systems 110 joining the network to host the proof of space plot.

In FIG. 7, the memory sub-system 110 has a communication device 293 (e.g., a network interface 215) operable with assistance from the host system 120. The communication device 293 is separate from a host interface 291 through which the host system 120 can control the memory sub-system 110. Alternatively, the memory sub-system 110 of FIG. 7 can be modified to control a network interface 215 as a host via a peripheral bus 275, as in FIG. 6.

Figure 8:
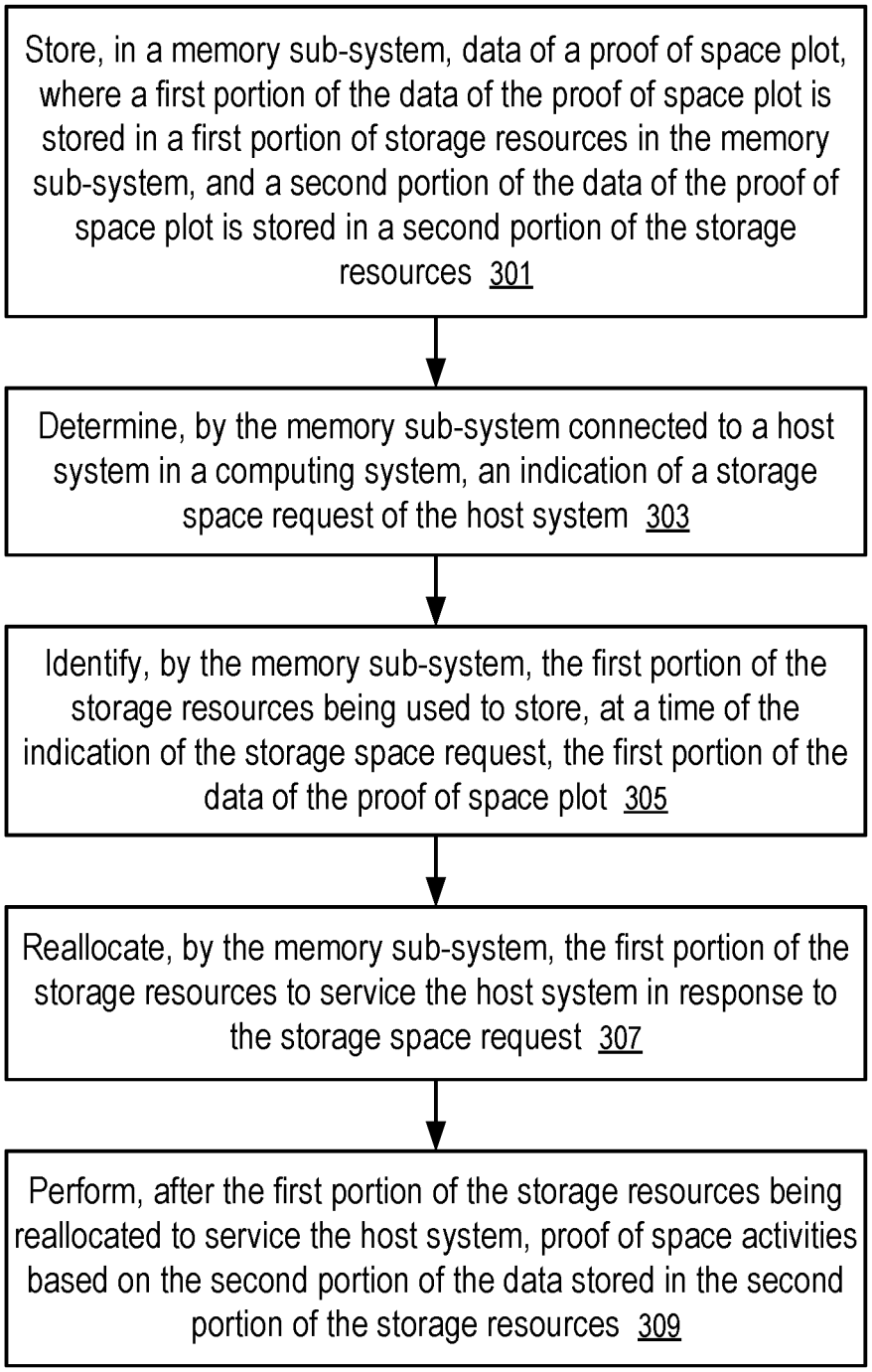
FIG. 8 shows a method to reclaim storage space occupied by proof of space plots in a memory sub-system according to one embodiment.

FIG. 8 shows a method to reclaim storage space occupied by proof of space plots in a memory sub-system according to one embodiment. The method of FIG. 8 can be performed by processing logic that can include hardware (e.g., processing device, circuitry, dedicated logic, programmable logic, microcode, hardware of a device, integrated circuit, etc.), software/firmware (e.g., instructions run or executed on a processing device), or a combination thereof. In some embodiments, the method of FIG. 8 is performed at least in part by the controller 115 and/or the local media controller 150 of the memory sub-system 110 in FIG. 1 to FIG. 3, and/or by the processing device 118 of the host system 120. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

For example, the method of FIG. 8 can be implemented using the proof of space manager 113 of FIG. 1 to FIG. 3 using techniques of gradual reclaiming of storage resources as in FIG. 5, FIG. 6, or FIG. 7.

At block 301, a memory sub-system 110 stores data of a proof of space plot 209. A first portion of the data (e.g., lookup tables 211) of the proof of space plot 209 is stored in a first portion (e.g., 263) of storage resources in the memory sub-system 110; and a second portion of the data (e.g., lookup tables 211) of the proof of space plot 209 is stored in a second portion of the storage resources (e.g., a portion of the plot namespace 239 outside the portion 263).

For example, the proof of space manager 113 can be configured (e.g., via the configuration data 203) to determine, independent of the host system 120, free storage resources available in the memory sub-system 110. The proof of space manager 113 can allocate, independent of the host system 120, at least a portion of the free storage resources to a plot namespace on a storage capacity 205 of the memory sub-system 110 to store the proof of space plot 209. For example, the proof of space manager 113 can generate, independent of the host system 120, the proof of space plot 209. Alternatively, the proof of space manager 113 can acquire the proof of space plot 209 for outside of the memory sub-system 110 (e.g., from a cryptocurrency network 217, or a separate and/or remote computing device 279).

At block 303, the memory sub-system 110, connected to a host system 120 in a computing system 100, determines an indication of a storage space request 241 of the host system 120.

For example, the indication of the storage space request 241 for the host system 120 can be in response to a request from the host system 120 to create a host namespace 237 on the storage capacity 205 of the memory sub-system 110.

For example, the indication of the storage space request 241 for the host system 120 can be in response to a request from the host system 120 to enlarge a host namespace 237 on the storage capacity 205 of the memory sub-system 110.

For example, the indication of the storage space request 241 for the host system 120 can be in response to a command from the host system 120 to write to a thinly provisioned host namespace 237 on the storage capacity 205 of the memory sub-system 110.

The indication of the storage space request 241 of the host system 120 can cause the memory sub-system 110 to allocate storage resources to service the host system 120. When there are insufficient free storage resources in the memory sub-system 110, the memory sub-system 110 can reclaim storage resources from a plot namespace 239 without complete destruction of the proof of space plot 209.

For example, the proof of space manager 113 can divide the plot namespace 239 into a plurality of portions (e.g., 263). The plurality of portions can be reclaimed one at a time in response to one storage space request 241 for the host system 120.

At block 305, the memory sub-system 110 identifies the first portion of the storage resources (e.g., portion 263) that is being used to store, at the time of the indication of the storage space request 241, the first portion of the data of the proof of space plot 209.

At block 307, the memory sub-system 110 reallocates the first portion (e.g., 263) of the storage resources to service the host system 120, in response to the storage space request 241.

At block 309, after the first portion (e.g., 263) of the storage resources is reallocated to service the host system 120, the memory sub-system 110 can continue to perform proof of space activities based on the second portion of the data stored in the second portion of the storage resources (e.g., in the remaining portion of the plot namespace 239 outside of the reallocated portion 263).

Optionally, the first portion of the data of the proof of space plot 209, previously stored in the reallocated portion 263, can be transferred out of the memory sub-system 110 for preservation of the integrity of proof of space plot 209 and/or to support the continued proof of space activities using the proof of space plot 209.

For example, prior to the reallocating of the first portion 263 of the storage resources to service the host system 120, the proof of space manager 113 can retrieve the first portion of the data of the proof of space plot 209 from the first portion 263 of the storage resources, and send/write, by the memory sub-system, the first portion of the data of the proof of space plot to an auxiliary storage device 251 for storage.

For example, to reduce the performance impact in servicing the host system 120, the storage space request 241 of the host system 120 can be predicted (e.g., based on the past storage usage pattern of the host system 120). In response to a prediction of the storage space request 241 of the host system 120, the memory sub-system 110 can send/write the first portion of the data of the proof of space plot 209 to the auxiliary storage device 251. In response to the storage space request 241 of the host system 120, the first portion 263 of the storage resources can be available immediately for reallocation (e.g., without having to wait for the completion of the transfer of its data to the auxiliary storage device 251 for preservation).

Optionally, the auxiliary storage device 251 and the memory sub-system 110 are connected in the computing system 100 to the host system 120 via a peripheral bus 275, as in FIG. 6. When the host system 120 is in a low power mode, a sleep mode, or a hibernation mode, the proof of space manager 113 in the memory sub-system 110 can write of the first portion of the data of the proof of space plot 209, retrieved from the portion 263, to the auxiliary storage device 251, via operating the memory sub-system 110 as a host of the auxiliary storage device 251.

Optionally, the auxiliary storage device 251 can be connected to the computing system 100 via a connection over a network 420, as in FIG. 7; and the proof of space manager 113 can send/write the first portion of the data of the proof of space plot to the auxiliary storage device 251 via the network connection.

After the reallocation of the first portion 263 from a plot namespace 239 to a host namespace 237, the proof of space manager 113 can continue the proof of space activities based on the proof of space plot 209. During the proof of space activities, the memory sub-system can detect an operation to read the first portion 263 of the storage resources; and in response, the proof of space manager 113 can communicate with the auxiliary storage device to read the first portion of the data of the proof of space plot written in the auxiliary storage device 251, if the data has been sent/written to the auxiliary storage device 251 prior to the reallocation. Otherwise, the proof of space manager 113 can generate a read error as a response from the operation, as if the portion 263 had been damaged.

Thus, the proof of space manager 113 can transfer a plurality of portions of the proof of space plot 209 to a storage device (e.g., 251) outside of the memory sub-system 110, in response to a plurality of separate storage space requests (e.g., 241) of the host system 120 over a period of time. The transfer of each portion is driven by a separate storage space request (e.g., 241) that typically can be satisfied with a portion of the resources previously allocated to the plot namespace 239, instead of the entire plot namespace 239. During the period of time, responses (e.g., 273) to proof of space challenges (e.g., 271) can be generated using the proof of space plot 209 in the plot namespace 239. For example, a response 273 can be generated when the generation of the response 273 for the particular challenge 271 does not require the use of data that was previously in the reallocated portion 263. For example, a response 273 can be generated when the data in the reallocated portion 263 can be used via communication with the storage device (e.g., 251) that has a stored portion 253 corresponding to the data previously in the reallocated portion 263.

A non-transitory computer storage medium can be used to store instructions of the firmware of a memory sub-system (e.g., 110). When the instructions are executed by the controller 115 and/or the processing device 117, the instructions cause the controller 115, the processing device 117, and/or a separate hardware module to perform the methods discussed above.

Figure 9:
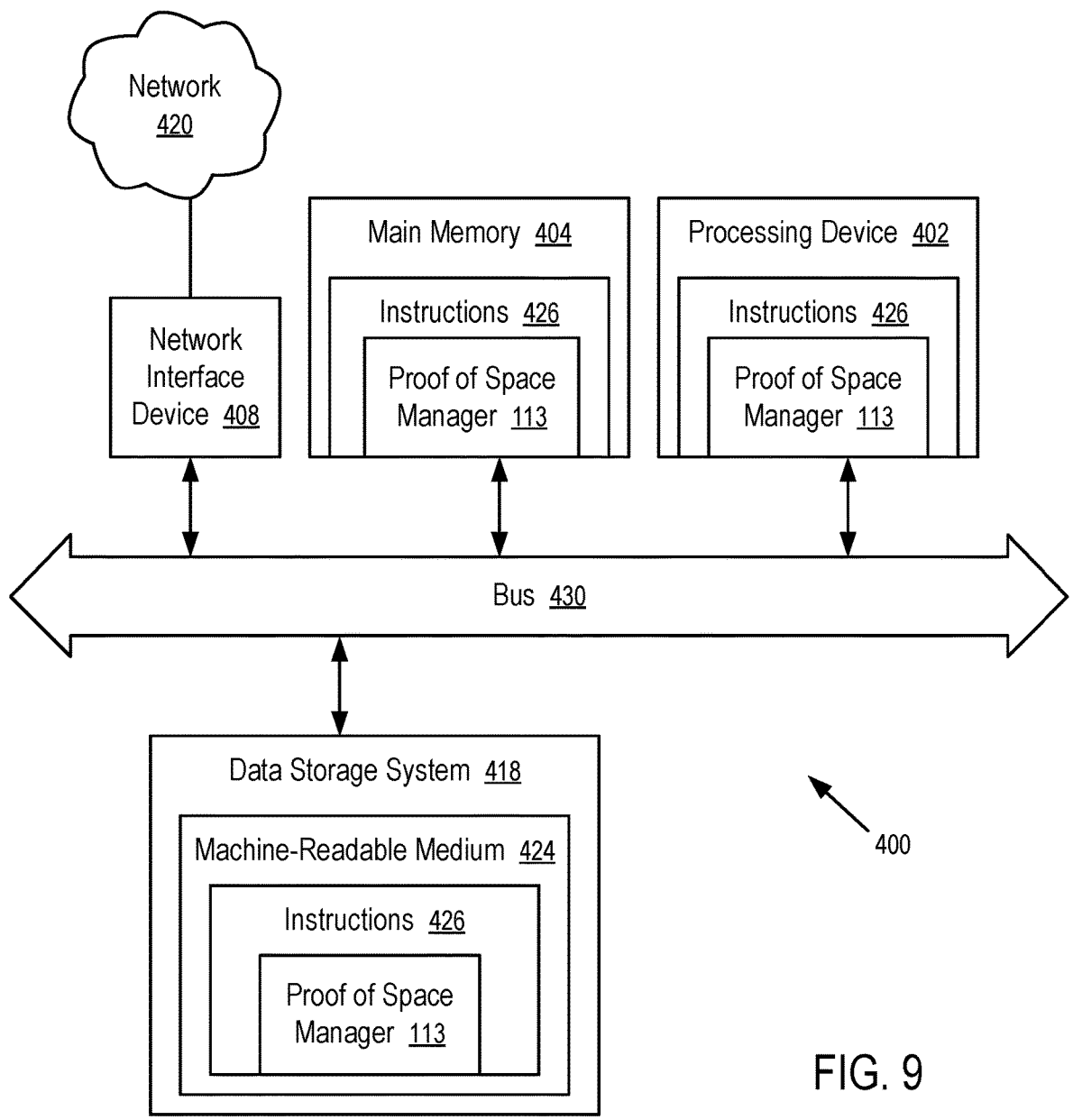
FIG. 9 is a block diagram of an example computer system in which embodiments of the present disclosure can operate.

FIG. 9 illustrates an example machine of a computer system 400 within which a set of instructions, for causing the machine to perform any one or more of the methodologies discussed herein, can be executed. In some embodiments, the computer system 400 can correspond to a host system (e.g., the host system 120 of FIG. 1 to FIG. 3) that includes, is coupled to, or utilizes a memory sub-system (e.g., the memory sub-system 110 of FIG. 1 to FIG. 3) or can be used to perform the operations of a proof of space manager 113 and/or a management plugin 233 (e.g., to execute instructions to perform operations corresponding to the proof of space manager 113 and/or the management plugin 233 described with reference to FIGS. 1-5). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a main memory 404 (e.g., read-only memory (ROM), flash memory, dynamic random access memory (DRAM) such as synchronous DRAM (SDRAM) or Rambus DRAM (RDRAM), static random access memory (SRAM), etc.), and a data storage system 418, which communicate with each other via a bus 430 (which can include multiple buses).

Processing device 402 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 402 can also be one or more special-purpose processing devices such as an application specific integrated circuit (ASIC), a field programmable gate array (FPGA), a digital signal processor (DSP), network processor, or the like. The processing device 402 is configured to execute instructions 426 for performing the operations and steps discussed herein. The computer system 400 can further include a network interface device 408 to communicate over the network 420.

The data storage system 418 can include a machine-readable medium 424 (also known as a computer-readable medium) on which is stored one or more sets of instructions 426 or software embodying any one or more of the methodologies or functions described herein. The instructions 426 can also reside, completely or at least partially, within the main memory 404 and/or within the processing device 402 during execution thereof by the computer system 400, the main memory 404 and the processing device 402 also constituting machine-readable storage media. The machine-readable medium 424, data storage system 418, and/or main memory 404 can correspond to the memory sub-system 110 of FIG. 1 to FIG. 3.

In one embodiment, the instructions 426 include instructions to implement functionality corresponding to the proof of space manager 113 and/or the management plugin 233 described with reference to FIGS. 1-5. While the machine-readable medium 424 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to convey the substance of their work most effectively to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In this description, various functions and operations are described as being performed by or caused by computer instructions to simplify description. However, those skilled in the art will recognize what is meant by such expressions is that the functions result from execution of the computer instructions by one or more controllers or processors, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method, comprising:
   storing, in a memory sub-system, data of a proof of space plot, wherein a first portion of the data of the proof of space plot is stored in a first portion of storage resources in the memory sub-system, and a second portion of the data of the proof of space plot is stored in a second portion of the storage resources;

reallocating, by the memory sub-system in response to an indication of a storage space request from a host system in a computing system, the first portion of the storage resources to service the host system, wherein the reallocating of the first portion of the storage resources includes deleting the first portion of the data of the proof of space plot from the memory sub-system to cause the first portion of the data of the proof of space plot to be unavailable in the memory sub-system while the second portion of the data of the proof of space plot remains available to proof of space computations in the memory sub-system; and performing, after the first portion of the storage resources being reallocated to service the host system, proof of space activities based on the second portion of the data stored in the second portion of the storage resources.

2. The method of claim 1, further comprising, prior to the reallocating of the first portion of the storage resources to service the host system:

retrieving the first portion of the data of the proof of space plot from the first portion of the storage resources; and writing, by the memory sub-system, the first portion of the data of the proof of space plot to an auxiliary storage device.

3. The method of claim 2, wherein the auxiliary storage device and the memory sub-system are connected in the computing system to the host system via a peripheral bus; and the writing of the first portion of the data of the proof of space plot to the auxiliary storage device is performed via operating the memory sub-system as a host of the auxiliary storage device when the host system is in a low power mode, a sleep mode, or a hibernation mode.

4. The method of claim 3, further comprising:

predicting the storage space request of the host system, wherein the writing of the first portion of the data of the proof of space plot to the auxiliary storage device is performed in response to a prediction of the storage space request of the host system.

5. The method of claim 2, wherein the auxiliary storage device is connected to the computing system via a network connection; and the writing of the first portion of the data of the proof of space plot to the auxiliary storage device is performed by the memory sub-system via the network connection.

6. The method of claim 2, wherein during the proof of space activities, the method further comprises:

detecting an operation to read the first portion of the storage resources; and communicating, by the memory sub-system, with the auxiliary storage device to read the first portion of the data of the proof of space plot written in the auxiliary storage device.

7. The method of claim 1, wherein during the proof of space activities, the method further comprises:

detecting an operation to read the first portion of the storage resources; and generating a read error as a response from the operation.

8. The method of claim 1, further comprising:

determining, by the memory sub-system and independent of the host system, free storage resources available in the memory sub-system;

allocating, by the memory sub-system and independent of the host system, at least a portion of the free storage resources to a namespace on a storage capacity of the memory sub-system to store the proof of space plot; and generating, by the memory sub-system and independent of the host system, the proof of space plot.

9. The method of claim 8, wherein the indication of the storage space request for the host system is in response to:

a request from the host system to create a namespace on the storage capacity of the memory sub-system;

a request from the host system to enlarge a namespace on the storage capacity of the memory sub-system; or a command from the host system to write to a thinly provisioned namespace on the storage capacity of the memory sub-system.

10. An apparatus, comprising:

a solid state drive, having:

a host interface configured to receive commands from a host system;

memory cells formed on at least one integrated circuit die; and a processor configured to control executions of the commands;

wherein the solid state drive has firmware configured to:

store data of a proof of space plot, wherein a first portion of the data of the proof of space plot is stored in a first portion of the memory cells in the solid state drive, and a second portion of the data of the proof of space plot is stored in a second portion of the memory cells;

delete, by the solid state drive in response to an indication of a storage space request from the host system, the first portion of the data of the proof of space plot from the solid state drive to reallocate the first portion of the memory cells to service the host system in response to the storage space request; and perform, after the first portion of the memory cells being reallocated to service the host system, proof of space activities based on the second portion of the data stored in the second portion of the memory cells after the first portion of the data of the proof of space is deleted from the solid state drive.

11. The apparatus of claim 10, wherein the firmware is further configured to cause the solid state drive to, prior to reallocation of the first portion of the memory cells to service the host system:

retrieve the first portion of the data of the proof of space plot from the first portion of the memory cells; and send, by the solid state drive, the first portion of the data of the proof of space plot to an auxiliary storage device.

12. The apparatus of claim 11, further comprising:

the host system;

the auxiliary storage device; and a peripheral bus configured to connect the auxiliary storage device, the solid state drive, and the host system;

wherein the first portion of the data of the proof of space plot is written to the auxiliary storage device via the solid state drive operating as a host of the auxiliary storage device when the host system is in a low power mode, a sleep mode, or a hibernation mode.

13. The apparatus of claim 11, wherein the auxiliary storage device is connected to the apparatus via a network connection; and the first portion of the data of the proof of space plot is sent to the auxiliary storage device by the solid state drive running the firmware and via the network connection.

14. The apparatus of claim 13, wherein the firmware is further configured to cause the solid state drive to:

predict the storage space request of the host system, wherein the first portion of the data of the proof of space plot is sent to the auxiliary storage device in response to a prediction of the storage space request of the host system.

15. The apparatus of claim 11, wherein during the proof of space activities, the firmware is further configured to cause the solid state drive to:

detect an operation to read the first portion of the memory cells; and communicate, by the solid state drive, with the auxiliary storage device to read the first portion of the data of the proof of space plot written in the auxiliary storage device.

16. The apparatus of claim 10, wherein during the proof of space activities, the firmware is further configured to cause the solid state drive to:

detect an operation to read the first portion of the memory cells; and generate a read error as a response from the operation.

17. The apparatus of claim 10, wherein the solid state drive is further configured via the firmware to:

determine, independent of the host system, free memory cells available in the solid state drive;

allocate, independent of the host system, at least a portion of the free memory cells to a namespace on a storage capacity of the solid state drive to store the proof of space plot; and generate, independent of the host system, the proof of space plot.

18. The apparatus of claim 17, wherein the indication of the storage space request for the host system is in response to:

a request from the host system to create a namespace on the storage capacity of the solid state drive;

a request from the host system to enlarge a namespace on the storage capacity of the solid state drive; or a command from the host system to write to a thinly provisioned namespace on the storage capacity of the solid state drive.

19. A non-transitory computer readable storage medium storing instructions which, when executed in a memory sub-system, causes the memory sub-system to perform a method, comprising:

storing, in the memory sub-system, data of a proof of space plot, wherein a first portion of the data of the proof of space plot is stored in a first portion of storage resources in the memory sub-system, and a second portion of the data of the proof of space plot is stored in a second portion of the storage resources;

deleting, by the memory sub-system in response to an indication of a storage space request from a host system in a computing system, the first portion of the data of the proof of space plot to reallocate the first portion of the storage resources to service the host system in response to the storage space request, wherein the reallocating of the first portion of the storage resources causes the first portion of the data of the proof of space plot to be unavailable in the memory sub-system while the second portion of the data of the proof of space plot remains available in the memory sub-system; and performing, after the first portion of the storage resources being deleted from the memory sub-system to service the host system, proof of space activities based on the second portion of the data stored in the second portion of the storage resources.

20. The non-transitory computer readable storage medium of claim 19, wherein the method further comprises:

dividing the data of the proof of space plot into a plurality of portions;

transferring the plurality of portions to a storage device outside of the memory sub-system in response to a plurality of separate storage space requests of the host system over a period of time; and generating, during the period of time, responses to proof of space challenges using the proof of space plot based on communication with the storage device to use portions of the data of the proof of space plot that have been transferred to the storage device.

* * * * *